United States Patent
Hong et al.

(10) Patent No.: US 12,291,586 B2
(45) Date of Patent: May 6, 2025

(54) METHOD OF PREPARING POLYMER

(71) Applicant: LG CHEM, LTD., Seoul (KR)

(72) Inventors: Sung Won Hong, Daejeon (KR); Hyung Sub Lee, Daejeon (KR); Dae Woo Lee, Daejeon (KR); Min Cheol Ju, Daejeon (KR); Seong Jae Shin, Daejeon (KR); Min Seung Shin, Daejeon (KR); In Soo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 581 days.

(21) Appl. No.: 17/783,682

(22) PCT Filed: Nov. 25, 2021

(86) PCT No.: PCT/KR2021/017531
§ 371 (c)(1),
(2) Date: Jun. 9, 2022

(87) PCT Pub. No.: WO2022/114813
PCT Pub. Date: Jun. 2, 2022

(65) Prior Publication Data
US 2023/0020924 A1      Jan. 19, 2023

(30) Foreign Application Priority Data

Nov. 27, 2020  (KR) .................. 10-2020-0163058
Nov. 24, 2021  (KR) .................. 10-2021-0163729

(51) Int. Cl.
| | | |
|---|---|---|
| C08F 212/12 | (2006.01) | |
| C08F 2/18 | (2006.01) | |
| C08F 212/08 | (2006.01) | |
| C08F 212/10 | (2006.01) | |
| C08F 220/44 | (2006.01) | |

(52) U.S. Cl.
CPC ............ *C08F 212/12* (2013.01); *C08F 2/18* (2013.01); *C08F 212/08* (2013.01); *C08F 212/10* (2013.01); *C08F 220/44* (2013.01)

(58) Field of Classification Search
CPC ........ C08F 212/12; C08F 2/18; C08F 212/08; C08F 220/44
See application file for complete search history.

(56) References Cited

U.S. PATENT DOCUMENTS

| | | |
|---|---|---|
| 3,491,071 A | 1/1970 | Lanzo |
| 4,558,108 A | 12/1985 | Alexandru et al. |
| 2015/0376316 A1 | 12/2015 | Heo et al. |
| 2016/0108224 A1 | 4/2016 | Seo et al. |
| 2019/0211195 A1 | 7/2019 | Jang et al. |
| 2020/0040115 A1 | 2/2020 | Seo et al. |
| 2021/0054124 A1 | 2/2021 | Ju et al. |

FOREIGN PATENT DOCUMENTS

| | | |
|---|---|---|
| CN | 105008417 A | 10/2015 |
| CN | 109890856 A | 6/2019 |
| CN | 110785445 A | 2/2020 |
| EP | 0115704 A1 | 8/1984 |
| EP | 2 937 366 A1 | 10/2015 |
| EP | 3597674 A1 | 1/2020 |
| KR | 10-0874030 B1 | 12/2008 |
| KR | 10-2015-0034979 A | 4/2015 |
| KR | 10-2015-0066386 A | 6/2015 |
| KR | 10-1646311 B1 | 8/2016 |
| KR | 10-2017-0062792 A | 6/2017 |
| KR | 10-1739621 B1 | 6/2017 |
| KR | 10-2017-0076272 A | 7/2017 |
| KR | 10-2018-0024350 A | 3/2018 |
| KR | 10-2020-0070651 A | 6/2020 |
| TW | 201326219 A | 7/2013 |

OTHER PUBLICATIONS

Extended European Search Report issued in corresponding European Patent Application No. 21898639.6, dated May 22, 2023.
International Search Report (with partial translation) and Written Opinion dated Mar. 2, 2022, for corresponding International Patent Application No. PCT/KR2021/017531.
Sharma, "Thermal terpolymerization of alphamethylstyrene, acrylonitrile and styrene," Polymer, 41: 1305-1308 (2000).
Rudin et al., "Terpolymerization of Methacrylonitrile, Styrene, and α-Methylstyrene," Canadian Journal of Chemistry, 50: 1757-1766 (1972).
Office Action issued Nov. 28, 2023 for Chinese Patent Application No. 202180007205.0 (Note: U.S. Pat. No. 3491071 A was cited in a prior IDS.).

*Primary Examiner* — Catherine S Branch
(74) *Attorney, Agent, or Firm* — Morgan, Lewis & Bockius LLP

(57) ABSTRACT

The present invention relates to a method of preparing a polymer, which includes: adding a first reaction solution including an aqueous solvent and a monomer mixture including an alkyl-substituted aromatic vinyl-based monomer, an alkyl-unsubstituted aromatic vinyl-based monomer, and a vinyl cyanide-based monomer to a reactor and initiating polymerization; and performing polymerization by continuously adding an alkyl-substituted aromatic vinyl-based monomer to the reactor, wherein the first reaction solution satisfies Expression 1 (see the description of the invention).

10 Claims, No Drawings

METHOD OF PREPARING POLYMER

TECHNICAL FIELD

Cross-Reference to Related Application

This application claims priority to and the benefit of Korean Patent Application No. 10-2020-0163058, filed on Nov. 27, 2020, and Korean Patent Application No. 10-2021-0163729, filed on Nov. 24, 2021, the disclosures of which are incorporated herein by reference in their entirety.

TECHNICAL FIELD

The present invention relates to a method of preparing a polymer, and specifically, to a method of preparing a polymer which has a uniform composition throughout polymerization and a substantially reduced residual monomer content.

BACKGROUND ART

A graft polymer including a diene-based rubber polymer onto which an aromatic vinyl-based monomer unit and a vinyl cyanide-based monomer unit are grafted is excellent in all of processability, chemical resistance, flexibility, and impact resistance. However, since its weather resistance and heat resistance are poor due to the diene-based rubber polymer, the range of usage of the graft polymer is limited.

In order to improve the weather resistance and heat resistance of the graft polymer, various studies have been conducted, and studies to increase the heat resistance of a non-grafted polymer used together as a component of a thermoplastic resin composition have also been conducted. As the non-grafted polymer, a non-grafted polymer including an alkyl-unsubstituted aromatic vinyl-based monomer unit and a vinyl cyanide-based monomer is commonly used, and the introduction of an alkyl-substituted aromatic vinyl-based monomer instead of the alkyl-unsubstituted aromatic vinyl-based monomer has been proposed to improve heat resistance. However, in this case, due to the alkyl-substituted aromatic vinyl-based monomer unit, polymerization slowed down, depolymerization occurred, and an excessive amount of an oligomer was produced. Also, due to the vinyl cyanide-based monomer, a polymer whose composition is not uniform throughout polymerization was produced, and an excessive amount of unreacted monomer remained in a polymer because the vinyl cyanide-based monomer did not participate in polymerization until the late stage of polymerization.

RELATED-ART DOCUMENTS

Patent Documents (Patent Document 1) KR1646311B

DISCLOSURE

Technical Problem

The present invention is directed to providing a method of preparing a polymer which has a uniform composition throughout polymerization and a substantially reduced residual monomer content.

Technical Solution

The present invention provides (1) a method of preparing a polymer, which includes: adding a first reaction solution including an aqueous solvent and a monomer mixture including an alkyl-substituted aromatic vinyl-based monomer, an alkyl-unsubstituted aromatic vinyl-based monomer, and a vinyl cyanide-based monomer to a reactor and initiating polymerization; and performing polymerization by continuously adding the alkyl-substituted aromatic vinyl-based monomer to the reactor, wherein the first reaction solution satisfies the following Expression 1:

$$50 \leq (\text{Weight of monomer mixture})/(\text{Weight of first reaction solution}) \times 100 \leq 60. \quad \text{<Expression 1>}$$

In addition, the present invention provides (2) a method of preparing a polymer in which the continuous addition of the alkyl-substituted aromatic vinyl-based monomer is initiated when a polymerization conversion rate is 5% or less according to the method (1).

In addition, the present invention provides (3) a method of preparing a polymer in which the continuous addition of the alkyl-substituted aromatic vinyl-based monomer is terminated when a polymerization conversion rate is 50 to 60% according to the method (1) or (2).

In addition, the present invention provides (4) a method of preparing a polymer in which a weight ratio of the alkyl-substituted aromatic vinyl-based monomer added in the initiation of polymerization and the alkyl-substituted aromatic vinyl-based monomer added in the performance of polymerization is 75:25 to 95:5 according to any one of the methods (1) to (3).

In addition, the present invention provides (5) a method of preparing a polymer in which the continuously added alkyl-substituted aromatic vinyl-based monomer is continuously added while being contained in a second reaction solution including a suspending agent, a suspending aid, and an aqueous solvent according to any one of the methods (1) to (4).

In addition, the present invention provides (6) a method of preparing a polymer in which a weight ratio of the aqueous solvent added in the initiation of polymerization and the aqueous solvent added in the performance of polymerization is 50:50 to 70:30 according to any one of the methods (1) to (5).

In addition, the present invention provides (7) a method of preparing a polymer in which the second reaction solution contains the alkyl-substituted aromatic vinyl-based monomer in an amount of 10 to 25 wt % according to the method (5).

In addition, the present invention provides (8) a method of preparing a polymer in which an amount of the monomer mixture is 85 to 95 wt % with respect to a total weight of monomers added in the method of preparing the polymer according to any one of the methods (1) to (7).

In addition, the present invention provides (9) a method of preparing a polymer in which the monomer mixture includes: 50 to 75 wt % of the alkyl-substituted aromatic vinyl-based monomer; 1 to 10 wt % of the alkyl-unsubstituted aromatic vinyl-based monomer; and 20 to 40 wt % of the vinyl cyanide-based monomer according to any one of the methods (1) to (8).

In addition, the present invention provides (10) a method of preparing a polymer in which the polymerization is suspension polymerization according to any one of the methods (1) to (9).

Advantageous Effects

According to a method of preparing a polymer of the present invention, a polymer which has a uniform composition throughout polymerization and a substantially reduced residual monomer content can be prepared.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

As used herein, the term "alkyl-substituted aromatic vinyl-based monomer" may mean one or more selected from the group consisting of α-methyl styrene, p-methyl styrene, and 2,4-dimethyl styrene. As the alkyl-substituted aromatic vinyl-based monomer, α-methyl styrene is preferred.

As used herein, the term "alkyl-unsubstituted aromatic vinyl-based monomer" may mean one or more selected from the group consisting of styrene, 4-fluorostyrene, 4-chlorostyrene, 2-chlorostyrene, 4-bromostyrene, and 2-bromostyrene. As the alkyl-unsubstituted aromatic vinyl-based monomer, styrene is preferred.

As used herein, the term "vinyl cyanide-based monomer" may mean one or more selected from the group consisting of acrylonitrile, methacrylonitrile, 2-ethyl-acrylonitrile, and 2-chloroacrylonitrile. As the vinyl cyanide-based monomer, acrylonitrile is preferred.

As used herein, the term "aqueous solvent" may mean ion exchanged water or deionized water.

As used herein, the term "suspending agent" may mean one or more selected from the group consisting of water-soluble polyvinyl alcohol, partially hydrolyzed polyvinyl alcohol, polyacrylic acid, a polymer of vinyl acetate and maleic anhydride, hydroxypropyl methylcellulose, gelatin, calcium phosphate, tricalcium phosphate, hydroxyapatite, sorbitan monolaurate, sorbitan trioleate, polyoxyethylene, sodium lauryl sulfate, sodium dodecylbenzene sulfonate, and dioctyl sodium sulfosuccinate. As the suspending agent, tricalcium phosphate is preferred.

As used herein, the term "suspending aid" may mean one or more selected from the group consisting of polyoxyalkylene alkyl ether phosphates, sodium dodecylbenzene sulfonate, and sodium lauryl sulfate. As the suspending aid, a polyoxyalkylene alkyl ether phosphate having a wide usable range and excellent stability is preferred.

As used herein, the term "initiator" may be one or more selected from the group consisting of 2,5-dimethyl-2,5-di(t-butylperoxy)hexane, di(t-butylperoxy-isopropyl)benzene, t-butyl cumyl peroxide, di-(t-amyl)-peroxide, dicumyl peroxide, butyl 4,4-di(t-butylperoxy)valerate, t-butylperoxy-benzoate, 2,2-di(t-butylperoxy)butane, t-amylperoxy-benzoate, t-butylperoxy-acetate, t-butylperoxy-(2-ethylhexyl)carbonate, t-butylperoxy isopropyl carbonate, t-butylperoxy-3,5,5-trimethyl-hexanoate, 1,1-di(t-butylperoxy)cyclohexane, t-amylperoxyacetate, t-amylperoxy-(2-ethylhexyl)carbonate, 1,1-di(t-butylperoxy)-3,5,5-trimethylcyclohexane, 1,1-di(t-amylperoxy)cyclohexane, t-butylmonoperoxy-maleate, and 1,1'-azodi(hexahydrobenzonitrile), with one or more selected from the group consisting of dicumyl peroxide, 1,1-di(t-butylperoxy)cyclohexane, and 1,1'-azobis(cyclohexanecarbonitrile) being preferred.

As used herein, the term "polymerization conversion rate" indicates the degree to which monomers are polymerized to form a polymer and may be calculated by the following equation.

Polymerization conversion rate (%)={(Total weight of monomers added until polymerization is terminated)−(Total weight of unreacted monomers at time point where polymerization conversion rate is measured)}/(Total weight of monomers added until polymerization is terminated)×100

1. Method of Preparing Polymer

A method of preparing a polymer according to an embodiment of the present invention includes the steps of: 1) adding a first reaction solution including an aqueous solvent and a monomer mixture including an alkyl-substituted aromatic vinyl-based monomer, an alkyl-unsubstituted aromatic vinyl-based monomer, and a vinyl cyanide-based monomer to a reactor and initiating polymerization; and 2) performing polymerization by continuously adding the alkyl-substituted aromatic vinyl-based monomer to the reactor, wherein the first reaction solution satisfies the following Expression 1:

50≤(Weight of monomer mixture)/(Total weight of first reaction solution)×100≤60.  <Expression 1>

The present invention is technically characterized in that the concentration of monomers in the first reaction solution added before the initiation of polymerization is limited to a specific range, and an alkyl-substituted aromatic vinyl-based monomer is continuously added after the initiation of polymerization.

In detail, since the total amount of each of the monomer and aqueous solvent added in polymerization has been determined, when an alkyl-substituted aromatic vinyl-based monomer is continuously added after the initiation of polymerization, the concentration of the monomer mixture in the first reaction solution added before the initiation of polymerization is inevitably reduced. As a result, an excessive amount of the vinyl cyanide-based monomer included in the first reaction solution is dissolved in the aqueous solvent, and thus the polymerization conversion rate of the vinyl cyanide-based monomer at an early stage of polymerization is reduced, and thereby a polymer including a small amount of a vinyl cyanide-based monomer unit at an early stage of polymerization is prepared.

Meanwhile, since the alkyl-substituted aromatic vinyl-based monomer and the alkyl-unsubstituted aromatic vinyl-based monomer are water-insoluble, they are present only in monomer droplets. On the other hand, the vinyl cyanide-based monomer is partially water-soluble and thus may be dissolved in the aqueous solvent of the first reaction solution. However, according to the technical feature of the present invention, since an excessive amount of the monomer mixture is present in the first reaction solution, even when the vinyl cyanide-based monomer is dissolved in the aqueous solvent, an adequate amount of the vinyl cyanide-based monomer may be present in the monomer droplets. Accordingly, the polymerization conversion rate of the vinyl cyanide-based monomer is increased at an early stage of polymerization, and thus a polymer having a uniform composition throughout polymerization and excellent color characteristics may be prepared. Also, the increase in the polymerization conversion rate of the vinyl cyanide-based monomer results in the substantial reduction of residual monomer and residual oligomer contents, and thus preparation efficiency may be improved. Also, the first reaction solution may be smoothly mixed with the alkyl-substituted aromatic vinyl-based monomer continuously added after the initiation of polymerization to increase polymerization stability, and the polymerization conversion rate of the alkyl-substituted aromatic vinyl-based monomer may be increased, thereby preparing a polymer having excellent heat resistance. Also, a polymerization rate may be improved due to the continuous addition of the alkyl-substituted aromatic vinyl-based monomer having a low polymerization rate. Also, since the alkyl-unsubstituted aromatic vinyl-based monomer is included in the first reaction solution, a polymerization rate, which would be decreased by the alkyl-substituted aromatic vinyl-based monomer, may be increased, and depolymerization and oligomer production, which the alkyl-substituted aromatic vinyl-based monomer can cause, may be reduced.

Hereinafter, the method of preparing a polymer according to an embodiment of the present invention will be described in detail.

1) Initiation of Polymerization

First, a first reaction solution including an aqueous solvent and a monomer mixture including an alkyl-substituted aromatic vinyl-based monomer, an alkyl-unsubstituted aromatic vinyl-based monomer, and a vinyl cyanide-based monomer is added to a reactor, and polymerization is initiated.

In this case, the first reaction solution satisfies Expression 1 described above, and a value of Expression 1 is preferably 51 to 59, and more preferably 56 to 59. When the value of Expression 1 is satisfied, the concentration of the monomer mixture included in the first reaction solution is appropriate, and thus an adequate amount of the vinyl cyanide-based monomer may be present in monomer droplets, thereby increasing the polymerization conversion rate of the vinyl cyanide-based monomer at an early stage of polymerization. As a result, a polymer with a uniform composition throughout polymerization may be prepared. Also, due to the increase in the polymerization conversion rate of the vinyl cyanide-based monomer having a high polymerization rate, the entire polymerization rate, which would be decreased by the alkyl-substituted aromatic vinyl-based monomer, may be improved. Also, the viscosity of the first reaction solution may be appropriately maintained, and thus the first reaction solution may be smoothly mixed with the continuously added alkyl-substituted aromatic vinyl-based monomer, and the layer separation or suspension breaking of a polymer does not occur.

On the other hand, when the value of Expression 1 is less than the above-described range, the concentration of the monomer mixture included in the first reaction solution is lowered, and thus the amount of the vinyl cyanide-based monomer dissolved in the aqueous solvent is increased. Accordingly, the polymerization conversion rate of the vinyl cyanide-based monomer is decreased at an early stage of polymerization, and the content of residual oligomers and residual monomers is increased, and thus a polymer having a uniform composition throughout polymerization and excellent heat resistance may not be prepared. Also, the vinyl cyanide-based monomer that does not participate in polymerization until the late stage of polymerization is absorbed into a polymer, and thus the prepared polymer includes an excessive amount of vinyl cyanide-based monomer unit, leading to degradation of the color characteristics of the polymer. Also, the vinyl cyanide-based monomer that does not participate in polymerization until the late stage of polymerization reacts with other unreacted monomers to produce oligomers or remains in a monomer state, which may degrade preparation efficiency and the quality of a polymer.

In addition, when the value of Expression 1 exceeds the above-described range, the viscosity of the first reaction solution is excessively increased, and thus it is impossible to uniformly mix a polymer during polymerization. As a result, layer separation or suspension breaking occurs, and thus polymerization inevitably stops.

Additionally, when the alkyl-unsubstituted aromatic vinyl-based monomer is included in the first reaction solution, the alkyl-substituted aromatic vinyl-based monomer is polymerized together when the alkyl-unsubstituted aromatic vinyl-based monomer and the vinyl cyanide-based monomer are polymerized, and thus the polymerization conversion rate of the alkyl-unsubstituted aromatic vinyl-based monomer may be enhanced at an early stage of polymerization.

Meanwhile, an amount of the monomer mixture may be 85 to 95 wt %, and preferably 88 to 92 wt %, with respect to a total weight of monomers added in the method of preparing the polymer. When the above-described condition is satisfied, an oligomer production amount can be reduced, and accordingly, the heat resistance of a polymer can be improved. Also, the weight-average molecular weight of the polymer can be increased, and thus the mechanical properties of the polymer can be improved.

The monomer mixture may include: 50 to 75 wt % of the alkyl-substituted aromatic vinyl-based monomer; 1 to 10 wt % of the alkyl-unsubstituted aromatic vinyl-based monomer; and 20 to 40 wt % of the vinyl cyanide-based monomer. Preferably, the monomer mixture includes: 57 to 70 wt % of the alkyl-substituted aromatic vinyl-based monomer; 2 to 8 wt % of the alkyl-unsubstituted aromatic vinyl-based monomer; and 25 to 35 wt % of the vinyl cyanide-based monomer. When the above-described condition is satisfied, a polymer having a high polymerization conversion rate, an appropriate polymerization rate, and excellent heat resistance, chemical resistance, and color characteristics can be prepared.

The polymerization is preferably suspension polymerization which is easily controlled by using an aqueous solvent as a medium, has high yield, and includes a simple washing process.

The suspension polymerization may be initiated in the presence of an initiator, a suspending agent, and a suspending aid.

The initiator may be present in an amount of 0.1 to 0.8 parts by weight, and preferably 0.4 to 0.6 parts by weight, with respect to 100 parts by weight of the sum of monomers added in the method of preparing a polymer. When the above-described condition is satisfied, the polymerization conversion rate of a polymer can be increased, and a polymerization rate can be easily controlled. Also, degradation of the color characteristics of the polymer can be prevented.

The suspending agent may be present in an amount of 0.7 to 2.0 parts by weight, and preferably 1.0 to 1.5 parts by weight, with respect to 100 parts by weight of the sum of monomers added in the method of preparing a polymer. When the above-described condition is satisfied, the average particle diameter of a polymer can be adjusted to a desired level, and dispersion stability can be improved.

A weight ratio of the suspending agent and the suspending aid may be 200:1 to 300:1, and preferably 220:1 to 280:1. When the above-described condition is satisfied, the average particle diameter of a polymer can be adjusted to a desired level, and dispersion stability can be improved.

2) Performance of Polymerization

Subsequently, polymerization is performed by continuously adding an alkyl-substituted aromatic vinyl-based monomer to the reactor.

When the alkyl-substituted aromatic vinyl-based monomer is batch-added before the initiation of polymerization and not continuously added after the initiation of polymerization, an excessive amount of the alkyl-substituted aromatic vinyl-based monomer having a low polymerization rate is present at an early stage of polymerization, and thus a polymerization rate is substantially decreased, and the polymerization conversion rate of the alkyl-substituted aromatic vinyl-based monomer at an early stage of polymerization is substantially lowered. Accordingly, a polymer having a non-uniform composition throughout polymerization and degraded color characteristics may be prepared. Also, the alkyl-substituted aromatic vinyl-based monomer may react with the vinyl cyanide-based monomer and the like too late at the late stage of polymerization, and thus an excessive amount of oligomer may be produced.

However, when the alkyl-substituted aromatic vinyl-based monomer is continuously added, the alkyl-substituted aromatic vinyl-based monomer may be polymerized at an early stage of polymerization, and thus degradation of polymer color, which is caused by reaction of an excessive amount of the vinyl cyanide-based monomer at an early stage of polymerization, may be prevented.

The continuous addition of the alkyl-substituted aromatic vinyl-based monomer may be initiated when a polymerization conversion rate is 5% or less. When the above-described condition is satisfied, the polymerization participation rate of the alkyl-substituted aromatic vinyl-based monomer can be increased to increase the final polymerization conversion rate, and accordingly, the production of oligomer caused by the alkyl-substituted aromatic vinyl-based monomer can be minimized. Also, the alkyl-substituted aromatic vinyl-based monomer can also participate in polymerization at an early stage of polymerization, and thus a polymer having a uniform composition throughout polymerization and excellent color characteristics can be prepared.

The continuous addition of the alkyl-substituted aromatic vinyl-based monomer may be terminated when a polymerization conversion rate is 50 to 60%, and preferably 52 to 58%. When the above-described condition is satisfied, a transparent polymer can be prepared, and the alkyl-substituted aromatic vinyl-based monomer can penetrate a polymer bead to form a chemical bond in the chain before the bead hardens, and thus a polymer with a uniform composition throughout polymerization can be prepared. Also, the polymerization conversion rate of the continuously added alkyl-substituted aromatic vinyl-based monomer can be increased.

Meanwhile, a weight ratio of the alkyl-substituted aromatic vinyl-based monomer added in the initiation of polymerization and the alkyl-substituted aromatic vinyl-based monomer continuously added in the performance of polymerization may be 75:25 to 95:5, and preferably 80:20 to 90:10.

As the amount of the alkyl-substituted aromatic vinyl-based monomer continuously added in the performance of polymerization increases, the amount of the vinyl cyanide-based monomer included in the first reaction solution also increases, and thus a polymerization rate is increased. When the above-described condition is satisfied, the amount of the vinyl cyanide-based monomer included in the first reaction solution can be appropriately adjusted, and thus a polymerization rate can be appropriately adjusted, and a polymer with a uniform composition can be prepared.

Meanwhile, the continuously added alkyl-substituted aromatic vinyl-based monomer may be continuously added while being contained in a second reaction solution including a suspending agent, a suspending aid, and an aqueous solvent.

In this case, a weight ratio of the aqueous solvent added in the initiation of polymerization and the aqueous solvent added in the performance of polymerization may be 50:50 to 70:30, and preferably 55:45 to 65:35. When the above-described condition is satisfied, a polymer uniformly including a vinyl cyanide-based monomer unit and having enhanced heat resistance can be prepared. Also, even when the viscosity of the first reaction solution is high, the viscosity of a polymer is lowered due to the second reaction solution, and thus polymerization can smoothly proceed.

The second reaction solution may include the alkyl-substituted aromatic vinyl-based monomer in an amount of 10 to 25 wt %, and preferably 13 to 22 wt %. When the above-described condition is satisfied, even when the viscosity of the first reaction solution is high, the viscosity of a polymer is lowered due to the second reaction solution, and thus polymerization can smoothly proceed.

3) Termination of Polymerization

After the step 2), when a polymerization conversion rate is 95% or more, the polymerization may be terminated.

When the polymerization is terminated at the above-described time point, polymerization and aging processes may be further performed after the continuous addition of the alkyl-substituted aromatic vinyl-based monomer is terminated. Accordingly, the alkyl-substituted aromatic vinyl-based monomer continuously added at a relatively late time point is able to sufficiently participate in polymerization, and thus the production of an oligomer may be suppressed, resulting in preparing a polymer with a uniform composition throughout polymerization.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention.

Example 1

<Preparation of First Reaction Solution>

57 parts by weight of α-methyl styrene (AMS), 3 parts by weight of styrene (S), 30 parts by weight of acrylonitrile (AN), 82 parts by weight of ion exchanged water, 0.5 parts by weight of an initiator (1,1-bis(t-butylperoxy)cyclohexane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Polymer>

The entire amount of the first reaction solution was added to a reactor, and the temperature inside the reactor was raised to 95° C. to initiate polymerization. After the initiation of polymerization, the polymerization was performed by continuously adding 10 parts by weight of α-methyl styrene (AMS) at a constant rate from the time point where a polymerization conversion rate reached 3% to the time point where the polymerization conversion rate reached 55%. In this case, the continuous addition of α-methyl styrene was performed at 95° C. for 360 minutes.

After the continuous addition of α-methyl styrene was terminated, the polymerization was performed for 60 minutes while maintaining the temperature inside the reactor at 95° C. Subsequently, the polymerization was performed while raising the temperature inside the reactor to 100° C. at a constant rate for 20 minutes, performed for 280 minutes while maintaining the temperature inside the reactor at 100° C., and then terminated to obtain a polymerization slurry.

Formic acid was added to the reactor to allow the polymerization slurry to have a pH of 2.5, and the resulting polymerization slurry was washed, dehydrated, and dried to prepare a bead-type polymer.

Example 2

Example 2 proceeded in the same manner as in Example 1, except that a first reaction solution with a composition shown in Table 1 was used.

Example 3

<Preparation of First Reaction Solution>

57 parts by weight of α-methyl styrene (AMS), 3 parts by weight of styrene (S), 30 parts by weight of acrylonitrile (AN), 74 parts by weight of ion exchanged water, 0.5 parts by weight of an initiator (1,1-bis(t-butylperoxy)cyclohexane), 1.17 parts by weight of a suspending agent (tricalcium phosphate), and 0.0045 parts by weight of a suspending aid (RS-710 commercially available from TOHO Chemical Industry Co., Ltd.) were homogeneously mixed to prepare a reaction solution.

<Preparation of Second Reaction Solution>

10 parts by weight of α-methyl styrene (AMS), 48 parts by weight of ion exchanged water, 0.13 parts by weight of a suspending agent (tricalcium phosphate), and 0.0005 parts by weight of a suspending aid (RS-710 commercially available from TOHO Chemical Industry Co., Ltd.) were homogeneously mixed to prepare a second reaction solution.

<Preparation of Polymer>

The entire amount of the first reaction solution was added to a reactor, and the temperature inside the reactor was raised to 95° C. to initiate polymerization. After the initiation of polymerization, the polymerization was performed by continuously adding the entire amount of the second reaction solution at a constant rate from the time point where a polymerization conversion rate reached 3% to the time point where the polymerization conversion rate reached 55%. In this case, the continuous addition of the second reaction solution was performed at 95° C. for 360 minutes.

After the continuous addition of the second reaction solution was terminated, the polymerization was performed for 60 minutes while maintaining the temperature inside the reactor at 95° C. Subsequently, the polymerization was performed while raising the temperature inside the reactor to 100° C. at a constant rate for 20 minutes, performed for 280 minutes while maintaining the temperature inside the reactor at 100° C., and then terminated to obtain a polymerization slurry.

Formic acid was added to the reactor to allow the polymerization slurry to have a pH of 2.5, and the resulting polymerization slurry was washed, dehydrated, and dried to prepare a bead-type polymer.

Example 4

Example 4 proceeded in the same manner as in Example 3, except that first and second reaction solutions with compositions shown in Table 1 were used.

Example 5

Example 5 proceeded in the same manner as in Example 1, except that first reaction solution with compositions shown in Table 1 were used.

Comparative Example 1

<Preparation of First Reaction Solution>

70 parts by weight of α-methyl styrene (AMS), 30 parts by weight of acrylonitrile (AN), 122 parts by weight of ion exchanged water, 0.5 parts by weight of an initiator (1,1-bis(t-butylperoxy)cyclohexane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a reaction solution.

<Preparation of Polymer>

The entire amount of the first reaction solution was added to a reactor, the temperature inside the reactor was raised to 95° C. to initiate polymerization, and the polymerization was performed for 420 minutes while maintaining the temperature inside the reactor at 95° C. Subsequently, the polymerization was performed while raising the temperature inside the reactor to 100° C. for 20 minutes, performed for 280 minutes while maintaining the temperature inside the reactor at 100° C., and then terminated to obtain a polymerization slurry.

Subsequently, formic acid was added to the reactor to allow the polymerization slurry to have a pH of 2.5, and the resulting polymerization slurry was washed, dehydrated, and dried to prepare a bead-type polymer.

Comparative Example 2

<Preparation of First Reaction Solution>

60 parts by weight of α-methyl styrene (AMS), 30 parts by weight of acrylonitrile (AN), 122 parts by weight of ion exchanged water, 0.5 parts by weight of an initiator (1,1-bis(t-butylperoxy)cyclohexane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Polymer>

The entire amount of the first reaction solution was added to a reactor, and the temperature inside the reactor was raised to 95° C. to initiate polymerization. After the initiation of polymerization, the polymerization was performed by continuously adding 10 parts by weight of α-methyl styrene (AMS) at a constant rate from the time point where a polymerization conversion rate reached 2% to the time point where the polymerization conversion rate reached 50%. In this case, the continuous addition of α-methyl styrene was performed at 95° C. for 360 minutes.

After the continuous addition of α-methyl styrene was terminated, the polymerization was performed for 60 minutes while maintaining the temperature inside the reactor at 95° C. Subsequently, the polymerization was performed while raising the temperature inside the reactor to 100° C. at a constant rate for 20 minutes, performed for 280 minutes while maintaining the temperature inside the reactor at 100° C., and then terminated to obtain a polymerization slurry.

Formic acid was added to the reactor to allow the polymerization slurry to have a pH of 2.5, and the resulting polymerization slurry was washed, dehydrated, and dried to prepare a bead-type polymer.

Comparative Example 3

<Preparation of First Reaction Solution>

50 parts by weight of α-methyl styrene (AMS), 30 parts by weight of acrylonitrile (AN), 122 parts by weight of ion exchanged water, 0.5 parts by weight of an initiator (1,1-bis(t-butylperoxy)cyclohexane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Polymer>

The entire amount of the first reaction solution was added to a reactor, and the temperature inside the reactor was raised to 95° C. to initiate polymerization. After the initiation of polymerization, the polymerization was performed by continuously adding 20 parts by weight of α-methyl styrene (AMS) at a constant rate from the time point where a polymerization conversion rate reached 3% to the time point where the polymerization conversion rate reached 55%. In this case, the continuous addition of α-methyl styrene was performed at 95° C. for 360 minutes.

After the continuous addition of α-methyl styrene was terminated, the polymerization was performed for 60 minutes while maintaining the temperature inside the reactor at 95° C. Subsequently, the polymerization was performed while raising the temperature inside the reactor to 100° C. at a constant rate for 20 minutes, performed for 280 minutes while maintaining the temperature inside the reactor at 100° C., and then terminated to obtain a polymerization slurry.

Formic acid was added to the reactor to allow the polymerization slurry to have a pH of 2.5, and the resulting polymerization slurry was washed, dehydrated, and dried to prepare a bead-type polymer.

Comparative Example 4

<Preparation of First Reaction Solution>

40 parts by weight of α-methyl styrene (AMS), 30 parts by weight of acrylonitrile (AN), 122 parts by weight of ion exchanged water, 0.5 parts by weight of an initiator (1,1-bis(t-butylperoxy)cyclohexane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Polymer>

The entire amount of the first reaction solution was added to a reactor, and the temperature inside the reactor was raised to 95° C. to initiate polymerization. After the initiation of polymerization, the polymerization was performed by continuously adding 30 parts by weight of α-methyl styrene (AMS) at a constant rate from the time point where a polymerization conversion rate reached 6% to the time point where the polymerization conversion rate reached 62%. In this case, the continuous addition of α-methyl styrene was performed at 95° C. for 360 minutes.

After the continuous addition of α-methyl styrene was terminated, the polymerization was performed for 60 minutes while maintaining the temperature inside the reactor at 95° C. Subsequently, the polymerization was performed while raising the temperature inside the reactor to 100° C. at a constant rate for 20 minutes, performed for 280 minutes while maintaining the temperature inside the reactor at 100° C., and then terminated to obtain a polymerization slurry.

Formic acid was added to the reactor to allow the polymerization slurry to have a pH of 2.5, and the resulting polymerization slurry was washed, dehydrated, and dried to prepare a bead-type polymer.

Comparative Example 5

<Preparation of First Reaction Solution>

67 parts by weight of α-methyl styrene (AMS), 3 parts by weight of styrene (S), 30 parts by weight of acrylonitrile (AN), 122 parts by weight of ion exchanged water, 0.5 parts by weight of an initiator (1,1-bis(t-butylperoxy)cyclohexane), 1.3 parts by weight of a suspending agent (tricalcium phosphate), and 0.005 parts by weight of a suspending aid (RS-710 commercially available from TOHO Chemical Industry Co., Ltd.) were homogeneously mixed to prepare a first reaction solution.

<Preparation of Polymer>

The entire amount of the first reaction solution was added to a reactor, the temperature inside the reactor was raised to 95° C. to initiate polymerization, and the polymerization was performed for 420 minutes while maintaining the temperature inside the reactor at 95° C. Subsequently, the polymerization was performed while raising the temperature inside the reactor to 100° C. at a constant rate for 20 minutes, performed for 280 minutes while maintaining the temperature inside the reactor at 100° C., and then terminated to obtain a polymerization slurry.

Subsequently, formic acid was added to the reactor to allow the polymerization slurry to have a pH of 2.5, and the resulting polymerization slurry was washed, dehydrated, and dried to prepare a bead-type polymer.

Comparative Example 6

<Preparation of First Reaction Solution>

60 parts by weight of styrene (S), 30 parts by weight of acrylonitrile (AN), 122 parts by weight of ion exchanged water, 0.03 parts by weight of an initiator (1,1-bis(t-butylperoxy)cyclohexane), 0.017 parts by weight of an initiator (dicumyl peroxide), 1.3 parts by weight of a suspending agent (tricalcium phosphate), 0.005 parts by weight of a suspending aid (RS-710 commercially available from TOHO Chemical Industry Co., Ltd.), and 0.08 parts by weight of a molecular weight controlling agent (t-dodecyl mercaptan) were homogeneously mixed to prepare a first reaction solution.

<Preparation of Polymer>

The entire amount of the first reaction solution was added to a reactor, and the temperature inside the reactor was raised to 95° C. to initiate polymerization. After the initiation of polymerization, the polymerization was performed by continuously adding 10 parts by weight of styrene at a constant rate from the time point where a polymerization conversion rate reached 10% to the time point where the polymerization conversion rate reached 75%. In this case, the continuous addition of styrene was performed at 95° C. for 240 minutes.

After the continuous addition of styrene was terminated, the polymerization was performed for 20 minutes while maintaining the temperature inside the reactor at 95° C. Subsequently, the polymerization was performed while raising the temperature inside the reactor to 102° C. for 20 minutes and performed for 40 minutes while maintaining the temperature inside the reactor at 102° C. Subsequently, the polymerization was performed while raising the temperature inside the reactor to 130° C. for 50 minutes, performed for 50 minutes while maintaining the temperature inside the reactor at 130° C., and then terminated to obtain a polymerization slurry.

Subsequently, formic acid was added to the reactor to allow the polymerization slurry to have a pH of 2.5, and the resulting polymerization slurry was washed, dehydrated, and dried to prepare a bead-type polymer.

Comparative Example 7

<Preparation of First Reaction Solution>

60 parts by weight of styrene (S), 30 parts by weight of acrylonitrile (AN), 109.8 parts by weight of ion exchanged water, 0.03 parts by weight of an initiator (1,1-bis(t-butylperoxy)cyclohexane), 0.017 parts by weight of an initiator (dicumyl peroxide), 1.3 parts by weight of a suspending agent (tricalcium phosphate), 0.005 parts by weight of a suspending aid (RS-710 commercially available from TOHO Chemical Industry Co., Ltd.), and 0.08 parts by weight of a molecular weight controlling agent (t-dodecyl mercaptan) were homogeneously mixed to prepare a first reaction solution.

<Preparation of Second Reaction Solution>

10 parts by weight of styrene(S), 12.2 parts by weight of ion exchanged water, 0.13 parts by weight of a suspending agent (tricalcium phosphate), and 0.0005 parts by weight of a suspending aid (RS-710 commercially available from TOHO Chemical Industry Co., Ltd.) were homogeneously mixed to prepare a second reaction solution.

<Preparation of Polymer>

The entire amount of the first reaction solution was added to a reactor, and the temperature inside the reactor was raised to 95° C. to initiate polymerization. After the initiation of polymerization, the polymerization was performed by continuously adding the second reaction solution at a constant rate from the time point where a polymerization conversion rate reached 10% to the time point where the polymerization conversion rate reached 75%. In this case, the continuous addition of the second reaction solution was performed at 95° C. for 180 minutes.

After the continuous addition of the second reaction solution was terminated, the polymerization was performed for 20 minutes while maintaining the temperature inside the reactor at 95° C. Subsequently, the polymerization was performed while raising the temperature inside the reactor to 102° C. at a constant rate for 20 minutes and performed for 40 minutes while maintaining the temperature inside the reactor at 102° C. Subsequently, the polymerization was performed while raising the temperature inside the reactor to 130° C. for 50 minutes, performed for 50 minutes while maintaining the temperature inside the reactor at 130° C., and then terminated to obtain a polymerization slurry.

Subsequently, formic acid was added to the reactor to allow the polymerization slurry to have a pH of 2.5, and the resulting polymerization slurry was washed, dehydrated, and dried to prepare a bead-type polymer.

Comparative Example 8

<Preparation of First Reaction Solution>

70 parts by weight of styrene (S), 30 parts by weight of acrylonitrile (AN), 122 parts by weight of ion exchanged water, 0.03 parts by weight of an initiator (1,1-bis(t-butylperoxy)cyclohexane), 0.017 parts by weight of an initiator (dicumyl peroxide), 1.3 parts by weight of a suspending agent (tricalcium phosphate), 0.005 parts by weight of a suspending aid (RS-710 commercially available from TOHO Chemical Industry Co., Ltd.), and 0.08 parts by weight of a molecular weight controlling agent (t-dodecyl mercaptan) were homogeneously mixed to prepare a reaction solution.

<Preparation of Polymer>

The entire amount of the first reaction solution was added to a reactor, the temperature inside the reactor was raised to 95° C. to initiate polymerization, and the polymerization was performed for 280 minutes while maintaining the temperature inside the reactor at 95° C. Subsequently, the polymerization was performed while raising the temperature inside the reactor to 102° C. at a constant rate for 20 minutes and performed for 40 minutes while maintaining the temperature inside the reactor at 102° C. Subsequently, the polymerization was performed while raising the temperature inside the reactor to 130° C. at a constant rate for 50 minutes, performed for 50 minutes while maintaining the temperature inside the reactor at 130° C., and then terminated to obtain a polymerization slurry.

Subsequently, formic acid was added to the reactor to allow the polymerization slurry to have a pH of 2.5, and the resulting polymerization slurry was washed, dehydrated, and dried to prepare a bead-type polymer.

Comparative Example 9

Comparative Example 9 proceeded in the same manner as in Example 1, except that a first reaction solution with a composition shown in Table 4 was used.

Comparative Example 10

<Preparation of First Reaction Solution>

A first reaction polymerization solution was prepared in the same manner as in Example 1, except that the first reaction solution had a composition shown in Table 4.

<Preparation of Polymer>

The entire amount of the first reaction solution was added to a reactor, and the temperature inside the reactor was raised to 95° C. to initiate polymerization. After the initiation of polymerization, the polymerization was performed by continuously adding 10 parts by weight of α-methyl styrene (AMS) at a constant rate from the time point where a polymerization conversion rate reached 3% to the time point where the polymerization conversion rate reached 55%. After the continuous addition was terminated, mixing did not proceed smoothly, and thus the polymerization stopped.

Experimental Example 1

The polymerization conversion rates and concentrations of the polymerization slurries according to the examples and comparative examples were measured by the following methods, and results thereof are shown in Table 1 to Table 4.

(1) Polymerization conversion rate (%): calculated by the following equation.

Polymerization conversion rate={(Total weight of monomers added until polymerization is terminated)−(Total weight of unreacted monomers at time point where polymerization conversion rate is measured)}/(Total weight of monomers added until polymerization is terminated)×100

(2) Concentration of polymerization slurry (%): calculated by the following equation.

Concentration of polymerization slurry={(Total weight of monomers added until polymerization is terminated)−(Total weight of unreacted monomers at time point where concentration of the polymerization slurry is measured)}/(Total weight of monomers and ion exchanged water added until polymerization is terminated)×100

Experimental Example 2

Physical properties of the polymers according to the examples and comparative examples were measured by the following methods, and results thereof are shown in Table 1 to Table 4 below.
(1) Color comparison: the polymer was vacuum-dried at 220° C. for 2 hours and then placed in a vial, and the colors thereof were visually compared.
○: appeared white, Δ: appeared slightly yellow, x: turned dark yellow (2) Glass transition temperature (° C.): measured by differential scanning calorimetry under the conditions of $1^{st}$ cycle at 250° C. and $2^{nd}$ cycle at 180° C.
(3) Residual oligomer (wt %): 4 g of the bead-type polymer was completely dissolved in 40 ml of tetrahydrofuran, 120 ml of methanol was added, the resulting precipitated solid was filtered and then vacuum-dried at 220° C. to obtain a pure polymer, and the amount of the pure polymer was measured and converted to the unit of wt %. Also, a residual monomer included in 4 g of the bead-type polymer was measured by gas chromatography, and the measured value was converted to the unit of wt %. Also, the conversion values (wt %) of the amounts of the pure polymer and residual monomer were substituted into the following equation to calculate the amount of residual oligomer.

Amount of residual oligomer (wt %)=100−Amount of pure polymer (wt %)−Amount of residual monomer (wt %)

(4) Residual monomer (wt %): a residual monomer included in 4 g of the bead-type polymer was measured by gas chromatography.

TABLE 1

| | Classification | Example 1 | Example 2 | Example 3 | Example 4 | Example 5 |
|---|---|---|---|---|---|---|
| First reaction solution | AMS (parts by weight) | 57 | 54 | 57 | 54 | 54 |
| | S (parts by weight) | 3 | 6 | 3 | 6 | 6 |
| | AN (parts by weight) | 30 | 30 | 30 | 30 | 30 |
| | Ion exchanged water (parts by weight) | 82 | 82 | 74 | 74 | 65 |
| | Initiator (parts by weight) | 0.5 | 0.5 | 0.5 | 0.5 | 0.5 |
| | Suspending agent (parts by weight) | 1.3 | 1.3 | 1.17 | 1.17 | 1.3 |
| | Suspending aid (parts by weight) | 0.005 | 0.005 | 0.0045 | 0.0045 | 0.005 |
| | Value of Expression 1 | about 51.78 | about 51.78 | about 54.32 | about 54.32 | about 57.4 |
| Continuous addition | AMS (parts by weight) | 10 | 10 | 10 | 10 | 10 |
| | Ion exchanged water (parts by weight) | 0 | 0 | 48 | 48 | 0 |
| | Suspending agent (parts by weight) | 0 | 0 | 0.13 | 0.13 | 0 |
| | Suspending aid (parts by weight) | 0 | 0 | 0.0005 | 0.0005 | 0 |
| | Time of initiation of continuous addition (polymerization conversion rate, %) | 3 | 3 | 3 | 3 | 3 |
| | Time of termination of continuous addition (polymerization conversion rate, %) | 55 | 55 | 55 | 55 | 55 |
| | Addition time (mins) | 360 | 360 | 360 | 360 | 360 |
| Polymerization slurry | Polymerization conversion rate (%) | 96.7 | 97.25 | 96.8 | 97.05 | 97.70 |
| | Concentration (wt %) | about 55 | about 55 | about 45 | about 45 | about 62 |
| Polymer | Color | ○ | ○ | ○ | ○ | ○ |
| | Glass transition temperature (° C.) | 127.6 | 126.3 | 127.2 | 126.1 | 127.7 |
| | Residual oligomer (wt %) | 1.6 | 1.7 | 2.3 | 2.4 | 1.4 |
| | Residual monomer (wt %) | 3.30 | 2.75 | 3.20 | 2.95 | 2.30 |

TABLE 2

| Classification | | Comparative Example 1 | Comparative Example 2 | Comparative Example 3 | Comparative Example 4 |
|---|---|---|---|---|---|
| First reaction solution | AMS (parts by weight) | 70 | 60 | 50 | 40 |
| | S (parts by weight) | 0 | 0 | 0 | 0 |
| | AN (parts by weight) | 30 | 30 | 30 | 30 |
| | Ion exchanged water (parts by weight) | 122 | 122 | 122 | 122 |
| | Initiator (parts by weight) | 0.5 | 0.5 | 0.5 | 0.5 |
| | Suspending agent (parts by weight) | 1.3 | 1.3 | 1.3 | 1.3 |
| | Suspending aid (parts by weight) | 0.005 | 0.005 | 0.005 | 0.005 |
| | Value of Expression 1 | about 44.68 | about 42.09 | about 39.25 | about 36.11 |
| Continuous addition | AMS (parts by weight) | 0 | 10 | 20 | 30 |
| | S (parts by weight) | 0 | 0 | 0 | 0 |
| | Ion exchanged water (parts by weight) | 0 | 0 | 0 | 0 |
| | Suspending agent (parts by weight) | 0 | 0 | 0 | 0 |
| | Suspending aid (parts by weight) | 0 | 0 | 0 | 0 |
| | Time of initiation of continuous addition (polymerization conversion rate, %) | 0 | 2 | 3 | 6 |
| | Time of termination of continuous addition (polymerization conversion rate, %) | 0 | 50 | 55 | 62 |
| | Addition time (mins) | 0 | 360 | 360 | 360 |
| Polymerization slurry | Polymerization conversion rate (%) | 97.19 | 97.61 | 97.04 | 96.67 |
| | Concentration (wt %) | about 45 | about 45 | about 45 | about 45 |
| Polymer | Color | x | Δ | Δ | ○ |
| | Glass transition temperature (° C.) | 125.5 | 125.1 | 124.6 | 123.9 |
| | Residual oligomer (wt %) | 4.3 | 4.2 | 4.3 | 4.5 |
| | Residual monomer (wt %) | 3.81 | 3.39 | 3.96 | 4.33 |

TABLE 3

| Classification | | Comparative Example 5 | Comparative Example 6 | Comparative Example 7 | Comparative Example 8 |
|---|---|---|---|---|---|
| First reaction solution | AMS (parts by weight) | 67 | 0 | 0 | 0 |
| | S (parts by weight) | 3 | 60 | 60 | 70 |
| | AN (parts by weight) | 30 | 30 | 30 | 30 |
| | Ion exchanged water (parts by weight) | 122 | 109.8 | 109.8 | 122 |
| | Initiator (parts by weight) | 0.5 | 0.047 | 0.047 | 0.047 |
| | Suspending agent (parts by weight) | 1.3 | 1.3 | 1.3 | 1.3 |
| | Suspending aid (parts by weight) | 0.005 | 0.005 | 0.005 | 0.005 |
| | Molecular weight controlling agent (parts by weight) | 0 | 0.08 | 0.08 | 0.08 |
| | Value of Expression 1 | about 44.68 | about 44.72 | about 44.72 | about 44.67 |

TABLE 3-continued

| Classification | | Comparative Example 5 | Comparative Example 6 | Comparative Example 7 | Comparative Example 8 |
|---|---|---|---|---|---|
| Continuous addition | AMS (parts by weight) | 0 | 0 | 0 | 0 |
| | S (parts by weight) | 0 | 10 | 10 | 0 |
| | Ion exchanged water (parts by weight) | 0 | 0 | 12.2 | 0 |
| | Suspending agent (parts by weight) | 0 | 0 | 0.13 | 0 |
| | Suspending aid (parts by weight) | 0 | 0 | 0.005 | 0 |
| | Time of initiation of continuous addition (polymerization conversion rate, %) | 0 | 10 | 10 | 0 |
| | Time of termination of continuous addition (polymerization conversion rate, %) | 0 | 75 | 75 | 0 |
| | Addition time (mins) | 0 | 180 | 180 | 0 |
| Polymerization slurry | Polymerization conversion rate (%) | 98.03 | 98.28 | 98.5 | 99.01 |
| | Concentration (wt %) | about 45 | about 45 | about 45 | about 45 |
| Polymer | Color | x | Δ | Δ | x |
| | Glass transition temperature (° C.) | 124.9 | 109.2 | 110.8 | 109.4 |
| | Residual oligomer (wt %) | 3.9 | 3.1 | 3.2 | 3.4 |
| | Residual monomer (wt %) | 1.97 | 1.72 | 1.50 | 0.99 |

TABLE 4

| Classification | | Comparative Example 9 | Comparative Example 10 |
|---|---|---|---|
| First reaction solution | AMS (parts by weight) | 54 | 54 |
| | S (parts by weight) | 6 | 6 |
| | AN (parts by weight) | 30 | 30 |
| | Ion exchanged water (parts by weight) | 95 | 53 |
| | Initiator (parts by weight) | 0.5 | 0.5 |
| | Suspending agent (parts by weight) | 1.3 | 1.3 |
| | Suspending aid (parts by weight) | 0.005 | 0.005 |
| | Value of Expression 1 | about 48.18 | about 62.15 |
| Continuous addition | AMS (parts by weight) | 10 | 10 |
| | Ion exchanged water (parts by weight) | 0 | 0 |
| | Suspending agent (parts by weight) | 0 | 0 |
| | Suspending aid (parts by weight) | 0 | 0 |
| | Time of initiation of continuous addition (polymerization conversion rate, %) | 3 | 3 |
| | Time of termination of continuous addition (polymerization conversion rate, %) | 55 | 55 |
| | Addition time (mins) | 360 | 360 |
| Polymerization slurry | Polymerization conversion rate (%) | 97.18 | — |
| | Concentration (wt %) | about 50 | — |
| Polymer | Color | ○ | — |
| | Glass transition temperature (° C.) | 125.8 | — |
| | Residual oligomer (wt %) | 2.5 | — |
| | Residual monomer (wt %) | 2.82 | — |

Referring to Table 1 to Table 4, Examples 1 to 5, in which all styrene, α-methyl styrene, and acrylonitrile were added before the initiation of polymerization, the value of Expression 1 was satisfied, and α-methyl styrene was continuously added after the initiation of polymerization, exhibited excellent color characteristics, high glass transition temperatures, and low residual oligomer and residual monomer contents. Meanwhile, Comparative Example 1, in which styrene was not used as a monomer, all monomers were batch-added before the initiation of polymerization, and the value of Expression 1 was not satisfied, exhibited degraded color characteristics and high residual oligomer and residual monomer contents. Comparative Examples 2 and 3, in which styrene was not used as a monomer, the value of Expression 1 was not satisfied, and α-methyl styrene was continuously added, exhibited degraded color characteristics, low glass transition temperatures, and high residual oligomer and residual monomer contents.

Comparative Example 4, in which styrene was not used as a monomer, the value of Expression 1 was not satisfied, and α-methyl styrene was continuously added, exhibited excellent color characteristics, but exhibited a low glass transition temperature and high residual oligomer and residual monomer contents.

Comparative Example 5, in which the value of Expression 1 was not satisfied, and all monomers were batch-added before the initiation of polymerization, exhibited degraded color characteristics, a low glass transition temperature, and a high residual oligomer content.

Comparative Examples 6 and 7, in which α-methyl styrene was not used as a monomer, the value of Expression 1 was not satisfied, and styrene was continuously added, exhibited degraded color characteristics, low glass transition temperatures, and high residual oligomer contents.

Comparative Example 8, in which α-methyl styrene was not used as a monomer, the value of Expression 1 was not satisfied, and all monomers were batch-added before the initiation of polymerization, exhibited degraded color characteristics, a low glass transition temperature, and a high residual oligomer content.

In the case of Comparative Example 9 in which all styrene, α-methyl styrene, and acrylonitrile were added before the initiation of polymerization, and α-methyl styrene was continuously added after the initiation of polymerization, but the value of Expression 1 was about 48.18, the residual oligomer content was increased 147% or more compared to Example 2 and 178% or more compared to Example 5. Also, the residual monomer content of Comparative Example 9 was increased 102% or more compared to Example 2 and 122% or more compared to Example 5.

In the case of Comparative Example 10 in which all styrene, α-methyl styrene, and acrylonitrile were added before the initiation of polymerization, and α-methyl styrene was continuously added after the initiation of polymerization, but the value of Expression 1 was about 62.15, mixing was difficult during polymerization due to the excessively high concentration of the reaction solution. For this reason, polymerization inevitably stopped.

From these results, it can be seen that color characteristics and heat resistance are excellent and residual oligomer and residual monomer contents are lowered, and thereby preparation efficiency is improved, only when all styrene, α-methyl styrene, and acrylonitrile are used as monomers, the value of Expression 1 is satisfied, and α-methyl styrene is continuously added.

The invention claimed is:

1. A method of preparing a polymer, comprising:
adding a first reaction solution including an aqueous solvent and a monomer mixture including an alkyl-substituted aromatic vinyl-based monomer, an alkyl-unsubstituted aromatic vinyl-based monomer, and a vinyl cyanide-based monomer to a reactor and initiating polymerization; and
continuously adding the alkyl-substituted aromatic vinyl-based monomer to the reactor to perform the polymerization,
wherein the first reaction solution satisfies the following Expression 1:

50≤(Weight of monomer mixture)/(Weight of first reaction solution)×100≤60.   <Expression 1>

2. The method of preparing a polymer of claim 1, further comprising initiating the continuous addition of the alkyl-substituted aromatic vinyl-based monomer when a polymerization conversion rate is 5% or less.

3. The method of preparing a polymer of claim 1, further comprising terminating the continuous addition of the alkyl-substituted aromatic vinyl-based monomer when a polymerization conversion rate is 50 to 60%.

4. The method of preparing a polymer of claim 1, wherein a weight ratio of the alkyl-substituted aromatic vinyl-based monomer added in the addition of the first reaction solution and the alkyl-substituted aromatic vinyl-based monomer added in the continuous addition is 75:25 to 95:5.

5. The method of preparing a polymer of claim 1, wherein the continuous addition includes continuously adding the alkyl-substituted aromatic vinyl-based monomer from a second reaction solution including the alkyl-substituted aromatic vinyl-based monomer, a suspending agent, a suspending aid, and an aqueous solvent.

6. The method of preparing a polymer of claim 1, wherein a weight ratio of the aqueous solvent added in the addition of the first reaction solution and the aqueous solvent added in the continuous addition is 50:50 to 70:30.

7. The method of preparing a polymer of claim 5, wherein the second reaction solution contains the alkyl-substituted aromatic vinyl-based monomer in an amount of 10 to 25 wt %.

8. The method of preparing a polymer of claim 1, wherein an amount of the monomer mixture is 85 to 95 wt % with respect to a total weight of monomers added in the method of preparing the polymer.

9. The method of preparing a polymer of claim 1, wherein the monomer mixture includes:
50 to 75 wt % of the alkyl-substituted aromatic vinyl-based monomer;
1 to 10 wt % of the alkyl-unsubstituted aromatic vinyl-based monomer; and
20 to 40 wt % of the vinyl cyanide-based monomer.

10. The method of preparing a polymer of claim 1, wherein the polymerization is suspension polymerization.

* * * * *